May 29, 1956     H. J. M. FORSTER     2,747,433
SHIFTING MECHANISM WITH FREE-WHEEL DEVICE, ESPECIALLY
FOR PLANETARY GEARINGS
Filed July 19, 1950
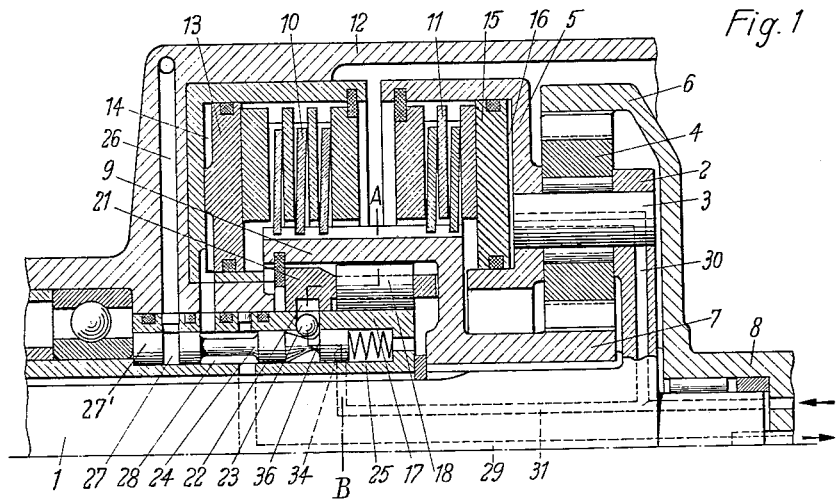
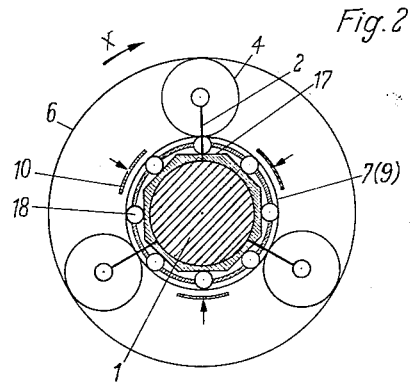
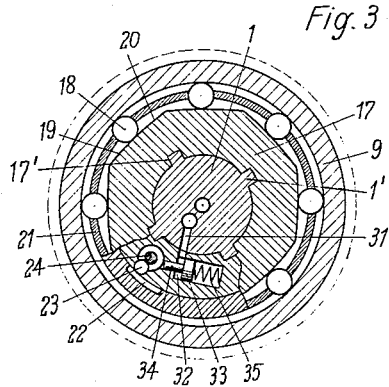
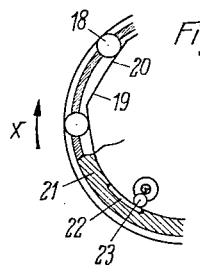
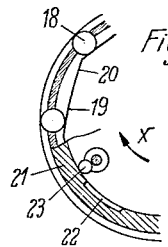
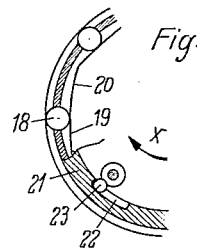
Inventor
Hans Joachim Max Förster
By Llike and Padlon
Attorneys

United States Patent Office 2,747,433
Patented May 29, 1956

2,747,433

SHIFTING MECHANISM WITH FREE-WHEEL DEVICE, ESPECIALLY FOR PLANETARY GEARINGS

Hans J. M. Forster, Harthausen a. F., Kr. Esslingen (Neckar), Germany, assignor to Daimler-Benz Aktiengesellschaft, Stuttgart-Unterturkheim, Germany Application July 19, 1950, Serial No. 174,687

Claims priority, application Germany July 22, 1949

25 Claims. (Cl. 74—781)

The present invention relates to a shifting mechanism with a free-wheeling device for change-speed transmissions, especially auxiliary transmissions with planetary gears for motor vehicles, preferably of the type having at least two gears or speed ratios one of which is engaged by locking one part of the transmission, for instance, a central gear wheel.

Accordingly, an object of the present invention is to provide a shifting arrangement by simple means.

Another object of the present invention further resides in the provision of an especially space-saving arrangement of the shifting means.

Still another object of the present invention is the provision of such an arrangement that upon shifting from one to another gear or speed as well as upon reversal of the driving direction, i. e., from a condition where the engine drives the vehicle to a condition where the vehicle drives the engine, the transmission and thereby the flow of power is not interrupted.

A further object of the present invention is a construction of the shifting device in such a way that a shockless shifting of the transmission is provided.

A main feature of the present invention, therefore, consists in the use of a free-wheeling device which when operating as a double-acting free-wheeling device provides a "gripping position" to transmit torque in both relative directions of rotation of the members to be operatively connected thereby and which is provided with means to render one of the gripping positions ineffective and to do so at least in one, preferably, however, only in one direction of rotation, especially if a speed ratio or gear, which is effected by locking one part of the transmission, is engaged.

According to a further feature of the present invention, the arrangement of the free-wheeling device is such that upon engagement of a speed or gear, which is obtained by locking one transmission part, the locking or gripping effect of the free-wheeling device is rendered ineffective only in that relative direction in which the two transmission parts move relatively to each other, when the particular speed or gear is engaged, with the drive effected from one side, for instance, from the engine to the wheels as well as from the other side, for instance from the wheels to the engine.

Furthermore, according to a further feature of the present invention, the arrangement of the device for rendering ineffective the locking or gripping effect of the free-wheeling device is such that the engagement of a speed or gear to be obtained by locking one of the transmission parts is prevented until the locking or gripping effect has been terminated, or that the device forcibly remains in that position in which the locking or gripping effect is rendered ineffective as long as the particular speed or gear in question remains engaged.

More particularly, this is realized according to the present invention in that the release or termination of the locking or gripping effect takes place by blocking or holding back a cage guiding the locking or gripping members such as, for instance, the clamp rollers of the free-wheeling device, relative to that part of the transmission part to be engaged by the free-wheeling device, against which the locking or gripping members may ordinarily perform a limited movement in the direction of rotation.

For that purpose the cage may be provided with an opening or stops producing a corresponding effect into which a locking member may enter in one locking or gripping position which is either prevented from entering the opening in the other locking or gripping position or prevents the cage from being displaced into the other locking or gripping position insofar as it had entered the opening previously.

According to a further feature of the present invention, the locking member may be connected, if so desired, with a control member for an auxiliary force operative to lock that transmission part which may be locked or may be actuated by this control member in such a way that the auxiliary force is able to lock the transmission part only after the locking member has been moved to its locking position.

According to a further feature of the present invention, an auxiliary clutch is connected in parallel with the free-wheeling device, which serves to synchronize the transmission parts to be engaged by the free-wheeling device and which is of a size not larger than the synchronization of the engine requires, for example, when shifting from overdrive to direct drive with the vehicle driving the engine. In this case, the re-establishment of the locking or gripping effect of the free-wheeling device is then arranged in such a way, for instance, by holding back a locking member, that it is released only after the clutch connected in parallel with the free-wheeling device has been engaged.

Further details, features and advantages of the present invention will become more obvious from the following description, when taken in connection with the accompanying drawing which shows, for purposes of illustration only, one embodiment in accordance with the present invention, and wherein Figure 1 is a longitudinal sectional view through a double-stage planetary change-speed transmission provided with a double-acting free-wheeling device which, for instance, is placed ahead of or behind the main change-speed transmission of a motor vehicle;

Figure 2 is a schematic view showing the operation of the planetary gear with a double-acting free-wheeling device used in connection with the present invention;

Figure 3 is a sectional view through the free-wheeling device along line A—B of Figure 1, in which the free-wheeling device is shown in its neutral mean position;

Figure 4 is a corresponding partial sectional view through the free-wheeling device showing the same in direct drive and with the engine driving the vehicle;

Figure 5 is a corresponding partial sectional view through the free-wheeling device showing the same in direct drive with the vehicle driving the engine, and Figure 6 is a corresponding partial sectional view through the free-wheeling device with the overdrive engaged, in which case the drive may be effected from the engine to vehicle as well as from the vehicle to the engine.

Referring now to the drawing wherein like reference numerals are used throughout the various views to designate like parts, and more particularly to Figure 1 in which the drive is effected by the drive shaft 1, driven, for instance, by the driving engine through a main clutch which is rigidly connected with the planet bearer 2, or is formed integrally therewith, reference numeral 3 designates the pins for the planet wheels 4 which are journalled in the planet bearer 2. Furthermore, an annular part 5, which is formed as a shifting cylinder, rotates together with the planet bearer 2 and the pins 3. The planet wheels 4 are in meshing engagement, on the one hand, with the outer central or annular ring gear 6 and, on the other hand, with the sungear wheel 7 of the planetary gearing. The annular ring gear 6 is connected with the driven shaft 8 which at the same time may serve as drive shaft for a main change-speed transmission for the vehicle drive placed behind the planetary gearing and containing, among others, the reverse gear for the vehicle drive. However, the main change-speed transmission may also be placed ahead of the auxiliary transmission including the planetary gearing. In that case, the driven shaft 8 may at the same time serve as pinion drive shaft for the rear axle gearing.

The sun wheel 7 is rigidly connected or coupled for common rotation with a bell-shaped hub part 9 which serves as internal support for the discs of a multiple-disc brake 10 as well as of a multiple-disc clutch 11. The multiple-disc brake 10, in its engaged position, thereby connects the transmission member or hub part 9 with the transmission casing 12, the engagement of the brake 10 being effected by means of a piston 13 actuated by a pressure fluid, for instance, pressure oil which is permitted to enter the shifting space 14. The multiple-disc clutch 11, on the other hand, connects the hub part 9, which itself is connected rigidly with the sun wheel 7, with the cylinder 5 which in turn is connected with the planet bearer 2, the engagement of clutch 11 being effected in that case by means of a piston 15 when pressure fluid is permitted to enter the shifting space 16.

Furthermore, an annular part 17 with spline grooves 17' is keyed to the drive shaft 1 provided with external splines 1' (Figure 3) and serves as inner ring for the clamp rollers 18 of a double-acting free-wheeling device, the external or outer ring of which is formed by the transmission member or hub part 9.

The outer ring formed by hub part 9 is provided with an internal cylindrical bearing surface for the clamp rollers 18, while the inner ring 17, as may be seen in Figures 3 to 6, is provided with oppositely acting ramps or gripping areas 19 and 20 for the individual clamping rollers 18. The clamping rollers 18 are retained by a cage 21 which, for instance, axially displaced to the rollers 18, is provided with an opening 22 of limited length in the circumferential direction thereof. A ball-shaped locking member 23 cooperates with the opening 22 in such a way that, assuming the direction of the arrow x to be the direction of the forward rotation for the drive shaft 1, it moves to the one side of the opening 22 when the clamping rollers 18 are in their mean neutral position, as can be seen in Figure 3.

The locking member or ball 23 is moved into its locking position, i. e., into engagement with the opening 22, by the inclined or conical surface of a control piston valve 24 provided—dependent on the position of the cage—such an engagement is possible and the control valve 24 serving also as piston is at the same time displaced to the right against the force of a spring 25 by a pressure fluid entering at 26 and flowing into the piston space 27. A sealing plug member 27' or the like is inserted into the left end portion of the piston space 27 to seal the latter against the outside.

In the position of the control piston valve 24 illustrated in Figure 1, the shifting space 14 for the piston 13 is, furthermore, connected through a control groove 28 in the piston valve 24 with a return line formed for instance by bores 29 in the drive shaft or driven shaft. When the control valve 24 moves to the right end position thereof, the connection between the shifting space 14 and the return line 29 is interrupted while the shifting space 14 is at the same time connected with the feed line 26 of the pressure fluid through the piston space 27. Furthermore, the shifting space 16 for the piston 15 is supplied with shifting fluid by a feed line 30 which is formed, for instance, also by bores in the drive shaft or driven shaft or in the planet bearer and the parts connected therewith. A branch 31 may thereby lead to a small pressure space 32 (Figure 3) in which a piston 33 with a locking pin 34 under the effect of a spring 35 may be displaced in such a way that the locking pin 34 moves behind the shoulder 36 of the control valve 24 and prevents the latter from returning to its left end position, or enables such a return only if a pressure is applied to the piston 33 in the space 32 by the pressure fluid.

The supply of the pressure fluid to the line 26 may be effected in any appropriate manner, for instance, manually or also automatically, for example, by placing the feed line 26 under pressure above a certain driving speed and by relieving the pressure below a certain driving speed which driving speed may be less when shifting down to a lower ratio, if so desired. The pressure fluid to the feed line 30 may suitably be controlled in such a way that the fluid is fed only at times, when the pressure in the shifting space 14 is relieved or immediately thereafter.

Operation

The transmission operates in the following way:

The brake 10, as well as the clutch 11, is assumed to be disengaged. The drive is effected from the engine through the drive shaft 1 and the planaet bearer 2, the direction of forward rotation being indicated by the direction of the arrow x. Due to the resistance at the annular gear 6, which is caused by the inertia of the vehicle and the friction at the wheels thereof thereby offering a resistance to rotation of driven shaft 8, the planet wheels 4 rotated by planet carrier 2 seek to rotate the sun gear 7 and therewith the outer ring 9 of the free-wheeling device at greater speed whereby the sun gear 7 together with the external ring 9 of the free-wheeling device attempts to overtake the drive shaft 1 together with the inner ring 17 of the free-wheeling device (Figure 2) in the direction x. As a consequence, the cage 21, which is frictionally driven by the member 7, 9 through frictional engagement therewith at its ends, rotates slightly in the direction x relative to the shaft 1 and inner ring 17, and thereby carries the gripping rollers 18 into the clamping position illustrated in Figure 4 between the outer ring 9 and the clamping surface or ramp 20 of the inner ring 17. The clamping position represented in Figure 4 is thus realized which effects a direct engagement of the planet bearer 2 with the sun wheel 7 and thereby effects a direct drive from the drive shaft 1 to the driven shaft 8.

If the direction of the drive is reversed, i. e., if the vehicle drives the engine, the clamp rollers 18 with the cage 21 move to the position illustrated in Figure 5. This is effected in the following manner:

When the vehicle starts to drive the engine in the direction x the ring gear 6 will attempt to accelerate the planet carrier 2 in the direction x. Due to the resistance to such acceleration encountered at members 1, 2, 3 which is caused by the resistance of the engine to acceleration beyond the setting corresponding to the setting of the throttle, gas pedal, or the like, the ring gear 6 will move the sun gear 7 and therewith the member 9 and the frictionally coupled cage 21 rearwardly to the member 1, 17, i. e., in a direction opposite to the arrow x. Such relative movement of the member 9 relative to the member 1, 17 results in the clamping position shown in Figure 5. In that case the locking member 23 does not exercise a locking effect on cage 21, even after entering the opening 22 in the position illustrated in Figure 4, as it is immediately pressed back into its bore as soon as the cage 21 assumes the position relative to the inner ring 17 illustrated in Figure 5.

Accordingly, a gripping effect is produced by the clamping rollers 18 if the brake 10 and the clutch 11 are disengaged, in each drive direction, i. e., in every relative direction of rotation of drive shaft and driven shaft with respect to each other, which results in a direct drive in all cases.

In order to shift arbitrarily or automatically into a gear or speed ratio producing an overdrive, the feed line 26 and the piston space 27 are supplied with pressure fluid or are placed under pressure, whereby the control piston valve 24 is pressed to the right against the pressure of the spring 25. If the free-wheeling device is in the position illustrated in Figure 5, i. e., if the drive takes place with the vehicle pushing or driving the engine, as, for example, during a downhill drive, the slide valve 24 cannot give way to the pressure of the pressure fluid, as the ball 23 cannot enter the opening 22 and thereby prevents the movement of the control valve 24 to the right. A change in transmission ratio, therefore, does not take place, or cannot take place, until the driver steps on the gas pedal and accelerates the car to thereby effect a condition of the drive according to Figure 3 or Figure 4. In that case, as soon as the ball 23 is placed in front of the opening 22, it is pressed into the opening 22 by the inclined surface of the control valve 24 which is loaded by the pressure fluid and moves to the right (Figure 1) and is locked therein by the control valve 24. At the same time, the locking pin 34 at the piston 33 is pressed forwardly by spring 35 and moves behind the shoulder 36 of the control valve 24, which prevents the control valve 24 from returning to the left, and which additionally prevents an escape of the ball 23 from the opening 22. As a result of the movement of the control valve 24, the pressure fluid can enter the shifting space 14 of the piston 13 through the piston space 27, whereby the multiple-disc brake 10 is engaged and therewith the external ring 9 of the free-wheeling device, as well as the sun wheel 7 of the planetary gear, is locked. In that case, if the drive shaft 1 with the internal ring 17 rotates in the forward direction x, as shown in Figure 6, the ball or the bolt member 23 prevents the clamping rollers 18 from assuming a gripping position on the inclined surface 19 of the internal ring 17 by stopping or arresting the cage in its mean position, and will do so with a driving engine as well as with a driving vehicle, as the direction of rotation of the drive shaft 1 is the same in both cases.

The fact that the driver with the vehicle pushing or driving the engine cannot engage the overdrive may be considered as an advantage especially if, for example, during a down-hill drive the driver wants to brake with the engine with the gas pedal released, i. e., with a closed throttle. Should he, nevertheless, want to drive in overdrive and, therefore, be satisfied with a lesser braking effect of the engine, he may achieve engagement of the overdrive even in this special case by giving gas or opening the throttle for a short time. Furthermore, with an automatic shifting, a too frequent and unnecessary shifting of the gears or speeds is prevented thereby as a shifting which might have taken place in other cases, for instance, when suddenly closing the throttle, is not effected.

The shifting of the planetary gearing with the main transmission placed behind that gearing is suitably provided in such a way that in all lower gears or speeds, for instance, up to the direct gear or speed, as well as in reverse gear, the direct transmission ratio is operatively engaged in the auxiliary planetary gearing, and that the sun wheel is braked only in order to obtain an overdrive. If desired, each of the two transmission ratios of the auxiliary planetary gearing may also be engaged, however, with every transmission ratio of the main change-speed transmission.

Any attempt of the vehicle to roll backward on an incline is not possible in the illustrated embodiment with the overdrive engaged for which, however, no practical need exists. The inner ring 17 would, in that case, seek to move oppositely to the rotational direction x relative to the locked external ring 9 of the free-wheeling device which, however, would immediately be prevented by the gripping effect of the rollers 18 along the gripping surfaces 20. In that case, the brake 10 would, therefore, lock the drive as a whole and thereby operate as an anti-rollback device for the vehicle.

On the other hand, the vehicle may roll backward easily with the auxiliary gearing in direct drive and an engaged forward speed of the main transmission. If, therefore, the overdrive of the auxiliary planetary gearing is engaged when the vehicle is to roll backward or if another reverse drive from the driven side of the transmission is desired, then the driver may obtain this by shifting to the direct speed, for instance, by releasing the pressure in the shifting space 14, if an automatic shifting of the transmission has not already taken place.

If, for instance, with a pushing vehicle the shifting from the overdrive to the direct speed would be effected immediately by disengaging the brake 10, then the sun wheel 7 released thereby would at once be gripped by the free-wheeling device and be locked thereby with the drive shaft 1 in the position according to Figure 5 by the change of the drive, which normally would result in a violent shock. In order to prevent this, the clutch 11 is provided, which tends to synchronize the transmission parts to be engaged by the free-wheeling device, i. e., to accelerate the drive shaft 1 and the engine to the speed of the driven shaft 8. In order to assure this synchronization and to prevent a premature release of the brake 10, the control valve 24, even though the pressure in the shifting space 14 may have already been released, may be moved to the left and, therefore, the cage be displaced from its position of Figure 6 to the position of Figure 5 only if the piston space 32 for the piston 33 with the locking pin 34 is supplied with fluid pressure at the same time as the shifting space 16 for the clutch piston. The piston 33 is then pressed back against the spring 35 and the control valve 24 can move to the left under the effect of the spring 25. When the clutch 11 is engaged and has effected complete or partial synchronization, a smooth and shockless engagement of the direct transmission on both the drive side and the driven side takes place.

If shifting-back from overdrive to direct speed is effected with open throttle, the engine will be accelerated after the brake 10 is released and the direct drive will be realized by the free-wheeling device which is locked in one direction only.

The invention is not limited to the illustrated embodiments but may be varied at will within the scope of the present invention except as defined by the present claims.

What I claim is:

1. In a planetary change-speed transmission providing two transmission ratios and having a plurality of rotating transmission members including a first transmission member and a second transmission member in driving connection with each other and means operatively connected with one of said first and second transmission members to change the transmission ratio from a first ratio to a second ratio, a free-wheeling device operatively connected between said first and second transmission members, said free-wheeling device being normally operative to be moved into a gripping position in the one as well as in the other relative direction of rotation of said first and second transmission members with respect to each other, and means for preventing said free-wheeling device from assuming only one of said two gripping positions, while enabling said free-wheeling device to assume the other of said gripping positions.

2. In a planetary change-speed transmission providing two transmission ratios and having a plurality of rotating transmission members including a first transmission and a second transmission member in driving connection with each other and means operatively connected with one of said first and second transmission members to effect a change in the transmission ratio, a free-wheeling device between said first and second transmission member, said free-wheeling device being normally operative to move into gripping position in the one as well as in the other relative direction of rotation of said first and second transmission members with respect to each other and being provided with an additional non-gripping mean position between the two gripping positions thereof, and means for keeping said free-wheeling device in said mean position in only one relative direction of rotation of said first and second transmission members with respect to each other to prevent said free-wheeling device from assuming the gripping position corresponding to said one relative direction of rotation.

3. In a change-speed planetary gearing providing two transmission ratios and including a plurality of transmission parts in operative engagement with each other including a first transmission part and a second transmission part and means for locking said second transmission part to provide a change in the transmission ratio, a free-wheeling device operatively connected between said two transmission parts, said free-wheeling device being normally movable into a gripping position in the one as well as in the other direction of rotation of said two transmission parts relative to each other, and means for preventing said free-wheeling device from assuming one of the two gripping positions.

4. In a change-speed planetary gearing providing two transmission ratios and including a plurality of transmission parts in operative engagement with each other including a first transmission part and a second transmission part, means for positively engaging said two transmission parts with each other to forcibly engage one of said transmission ratios and prevent engagement of the other transmission ratio, and means for locking said second transmission part against rotation to provide said other transmission ratio with said engaging means disengaged, a free-wheeling device operatively connected between said two transmission parts, said free-wheeling device being normally operative in the one as well as in the other direction of rotation of the two transmission parts relative to each other to be moved into a gripping position, and means for preventing said free-wheeling device from assuming one of said two gripping positions.

5. In a transmission the combination according to claim 3, further comprising means co-operating with said means for preventing said free-wheeling device from assuming said one gripping position only with said second transmission member locked upon engagement of said locking means.

6. In a change-speed planetary gearing providing two transmission ratios and having a plurality of transmission members in operative engagement with each other including a first transmission member, a second transmission member, a third transmission member in continuous meshing engagement with one of said first and second transmission members, means including another transmission member for locking said third transmission member against rotation thereof while enabling a transmission from said first to said second transmission member at one of said two transmission ratios different from the pre-existing transmission ratios, means for driving one of said two first-named transmission members in the forward direction of rotation, a free-wheeling device operatively connected between one of said two first-named transmission members and the third transmission member, said free-wheeling device having two gripping positions, one of which being operative only in the one relative direction of rotation between two of said transmission members and the other only in the other relative direction of rotation between said two last-named transmission members, and means for preventing said free-wheeling device from assuming that gripping position which it normally would assume with one of the two first-named transmission members driven in said forward direction of rotation.

7. In a planetary gearing the combination according to claim 6, wherein said means for locking said third transmission member includes means cooperating with said preventing means to prevent said free-wheeling device from assuming said last-named gripping position only with said third transmission member locked against rotation.

8. In a change-speed transmission with at least one higher and one lower transmission ratio and including a plurality of transmission members with first means for alternately and selectively effecting said two transmission ratios, a free-wheeling device operatively connected between two of said transmission members, said free-wheeling device having two oppositely operatively gripping positions in such a way that in the one relative direction of rotation of said two transmission members the free-wheeling device is moved to the one gripping position whereby the lower gear ratio is effected and that in the other relative direction of rotation the free-wheel device is moved to the other gripping position whereby the lower gear ratio is also effected, second means for preventing said free-wheeling device from assuming only one of said two gripping positions, and third means co-operating with said first means and said second means to enable engagement of said second means only while the higher gear ratio is effected by said first means.

9. In a transmission the combination according to claim 8, wherein said third means is operative in such a way that the higher gear ratio can be effected only after said second means has been moved to such a position in which the last-named gripping position of said free-wheeling device is prevented.

10. In a change-speed transmission providing two transmission ratios and having a plurality of transmission members including a first transmission member and a second transmission member in driving connection with each other and means for alternately and selectively effecting said two transmission ratios, a free-wheeling device arranged between said first transmission member and said second transmission member and constructed as a clamp roller ratchet with roller members able to exercise a limited rotation only relative to one of said first and second transmission members up to their gripping position in one relative direction of rotation of said first and second transmission members, said roller members being also moved into a gripping position during an opposite relative direction of rotation of said first and second transmission members, a cage retaining said roller members, an adjustable locking member between said cage and said one transmission member, and means operatively connected with said first-mentioned means for adjusting said locking member to enable free movement of said cage into both gripping positions in one of said two transmission ratios and in one position of said locking member and for preventing movement of said cage into only one of said gripping positions in the other transmission ratio and in a second position of said locking member.

11. In a change-speed transmission the combination according to claim 10, wherein said locking member is located in said one transmission member relative to which the cage with the roller members can exercise a limited rotation, said cage being provided with a recess extending in the circumferential direction thereof of such a length that said locking member is able to enter said recess only if said roller members have not yet reached one of said gripping positions, and said gripping position can be reached only if said locking member has not yet entered said recess.

12. In a change-speed transmission the combination according to claim 8, wherein said first means includes a device operated by an auxiliary force, and said second means includes a locking member alternately releasing the free-wheeling device for assuming said one gripping position or preventing said free-wheeling device from assuming said one gripping position, and wherein said third means further comprises a control member operated by said auxiliary force for moving said locking member into a position thereof preventing said one gripping position and for positively keeping said locking member in said last-mentioned position.

13. In a change-speed planetary gearing the combination according to claim 4, wherein said engaging means includes clutch members operatively connected with said two transmission members, and further comprising means for operatively interconnecting said engaging means with said preventing means to render said free-wheeling device effective again in said one gripping position only upon engagement of said engaging means whereby said two transmission members are engaged with each other by said clutch members.

14. In a change-speed planetary gearing the combination according to claim 4, wherein said free-wheeing device is constructed as a clamp roller ratchet with clamp roller members and a cage holding the same, and wherein said preventing means for preventing the gripping position includes a locking member and a second locking member locking said first locking means, and wherein said engaging means for engaging said two transmission members are constructed as hydraulically operated means, and further comprising means for hydraulically operating said second locking member, said two last-named means cooperating in such a way that the displacement of the second locking member into the releasing position thereof is effected only if at least simultaneously also said two transmission members are engaged by said engaging means.

15. In a planetary gearing, a casing, a transmission shaft, a rotatable sun gear with a hub-shaped part surrounding said transmission shaft in spaced relationship therewith, and means including a reversible free wheeling device between said shaft and said hub-shaped part for providing a gripping position for said free wheeling device in both relative directions of rotation of said transmission shaft and said sun gear with respect to each other, clutch means for engaging said transmission shaft with said sun gear for rotation together as a unit, and brake means to lock said sun gear against said casing, said clutch means and said brake means being arranged in parallel and concentric relationship outside said hub-shaped part.

16. In a planetary gearing, the combination according to claim 15, further comprising a hub part on said transmission shaft serving as an internal ring for said free wheeling device, and means for rendering ineffective at least one of said two gripping positions, said last-named means being located substantially within said named hub part.

17. In a change-speed transmission having at least two transmission ratios and a plurality of transmission members including a first transmission member and a second transmission member and means for locking one of said first and second transmission members against another one of said transmission members to thereby prevent rotation of said one transmission member and engage one of said two transmission ratios, a free-wheeling device operatively connected between said first and second transmission members normally movable into a gripping position in the one as well as the other relative direction of rotation of said first and second transmission members relative to each other to thereby engage the other of said two transmission ratios, and means operatively connected with said locking means for preventing said free-wheeling device from assuming only one of said two gripping positions with said locking means engaged.

18. In a change-speed transmission the combination according to claim 17, wherein the operative connection between said locking means and said preventing means includes means for delaying engagement of said locking means until engagement of said preventing means precludes said one gripping position from becoming effective.

19. In a change-speed transmission the combination according to claim 17, further comprising means for keeping said preventing means engaged as long as said one transmission ratio remains effective.

20. In a change-speed transmission the combination according to claim 19, further comprising clutch means between said first and second transmission members, and wherein said means for keeping said preventing means engaged as long as said one transmission ratio remains effective is operatively connected to said clutch means to release said preventing means only upon engagement of said clutch means.

21. In a planetary change-speed transmission having at least a direct transmission ratio and an overdrive transmission ratio and a plurality of transmission members including a sun gear, at least one planet wheel in meshing engagement with said sun gear, a planet carrier with shaft means connected thereto and means for locking said sun gear against another one of said transmission members to thereby prevent rotation of said sun gear and engage said overdrive transmission ratio, a free-wheeling device operatively connected between said sun gear and said shaft means normally movable into a gripping position in the one as well as the other direction of rotation of said sun gear and shaft means relative to each other to thereby engage said direct transmission ratio with said locking means disengaged, and means operatively connected with said locking means for preventing said free-wheeling device from assuming only one of said two gripping positions with said locking means engaged.

22. In a planetary change-speed transmission the combination according to claim 21, further comprising clutch means connected between said sun gear and said shaft means, means for hydraulically actuating said locking means and said clutch means including delay means for delaying engagement of said locking means until engagement of said preventing means and for delaying disengagement of said preventing means until engagement of said clutch means.

23. In a planetary change-speed transmission having at least a direct transmission ratio and an overdrive transmission ratio and a plurality of transmission members including a sun gear, a ring gear, at least one planet wheel in meshing engagement with said sun gear and said ring gear, a planet carrier, first shaft means connected with said planet carrier, second shaft means connected to said ring gear, and means for locking said sun gear against another one of said transmission members to thereby prevent rotation of said sun gear and engagement of said overdrive transmission ratio, a free-wheeling device with a cage operatively connected between said sun gear and said first shaft means normally movable into a gripping position in the one as well as the other direction of rotation of said sun gear and said first shaft means relative to each other to thereby engage said direct transmission ratio with said locking means disengaged, and means including a locking member operatively connected with said locking means for preventing said free-wheeling device from assuming only one of said two gripping positions with said locking means engaged.

24. In a planetary change-speed transmission according to claim 23, wherein said locking member is arranged between said cage and said first shaft means, further comprising piston means in said first shaft means for positively engaging said locking member, and hydraulic means for actuating said piston means and for actuating said locking means only after actuation of said locking member by said piston means.

25. In a planetary change-speed transmission the combination according to claim 24, further comprising clutch means between said sun gear and said first shaft means for accelerating said first shaft means during shifting from said overdrive to said direct transmission ratio prior to disengagement of said locking means with the speed of said second shaft means exceeding the speed of said first shaft means.

References Cited in the file of this patent

UNITED STATES PATENTS

| | | |
|---|---|---|
| 1,842,798 | Rauen | Jan. 26, 1932 |
| 2,028,512 | Maier | Jan. 21, 1936 |
| 2,106,905 | Barnes | Feb. 1, 1938 |
| 2,194,787 | Dunn | Mar. 26, 1940 |
| 2,214,986 | Barnes | Sept. 17, 1940 |
| 2,281,118 | Smirl | Apr. 28, 1942 |
| 2,333,115 | Neracher | Nov. 2, 1943 |
| 2,371,564 | Wemp | Mar. 13, 1945 |
| 2,372,734 | Orr | Apr. 3, 1945 |
| 2,438,620 | Russell | Mar. 30, 1948 |
| 2,453,156 | Neracher | Nov. 9, 1948 |
| 2,497,361 | Kesterton | Feb. 14, 1950 |
| 2,537,722 | Waton | Jan. 9, 1951 |
| 2,578,308 | Iavelli | Dec. 11, 1951 |
| 2,593,568 | Kelbel | Apr. 22, 1952 |
| 2,682,175 | Ruckelshaus | June 29, 1954 |

FOREIGN PATENTS

| | | |
|---|---|---|
| 875,966 | France | Oct. 9, 1942 |